Patented June 30, 1953

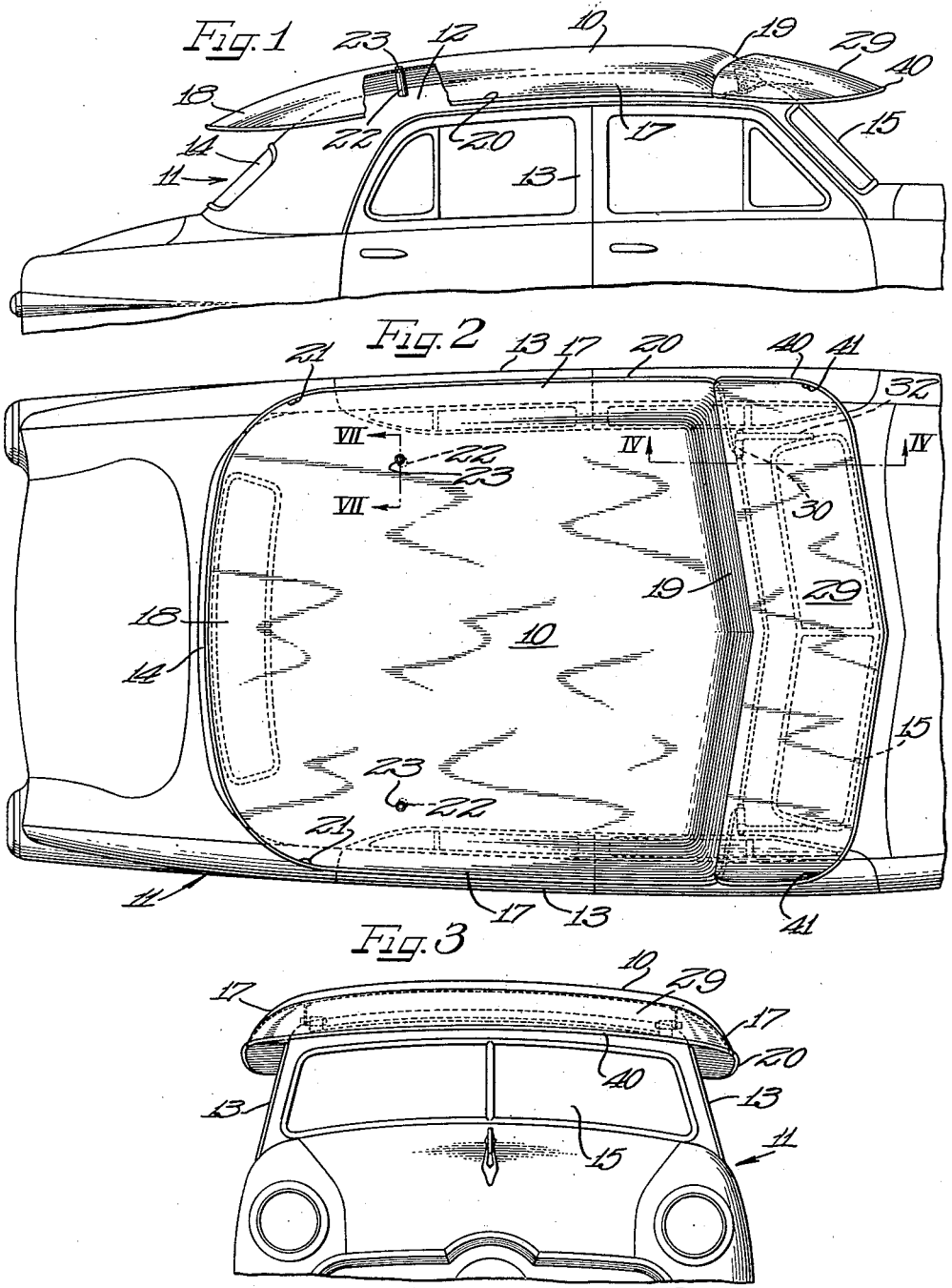

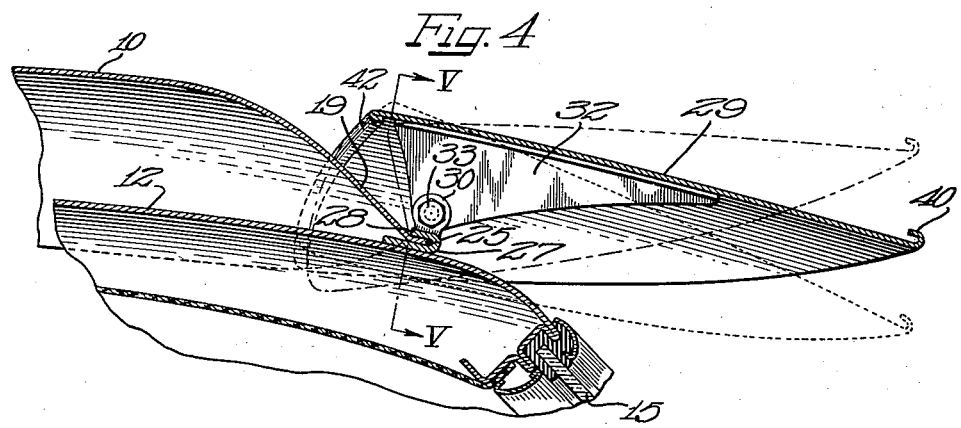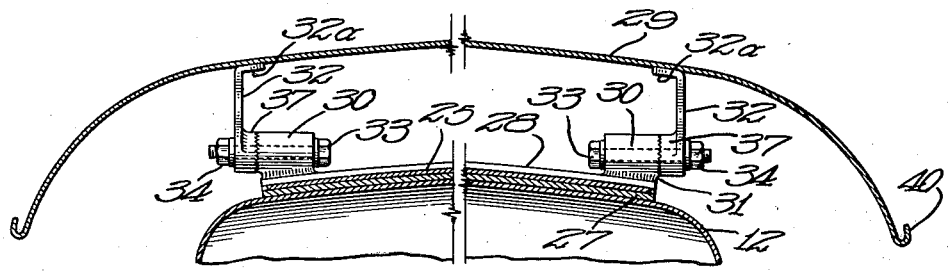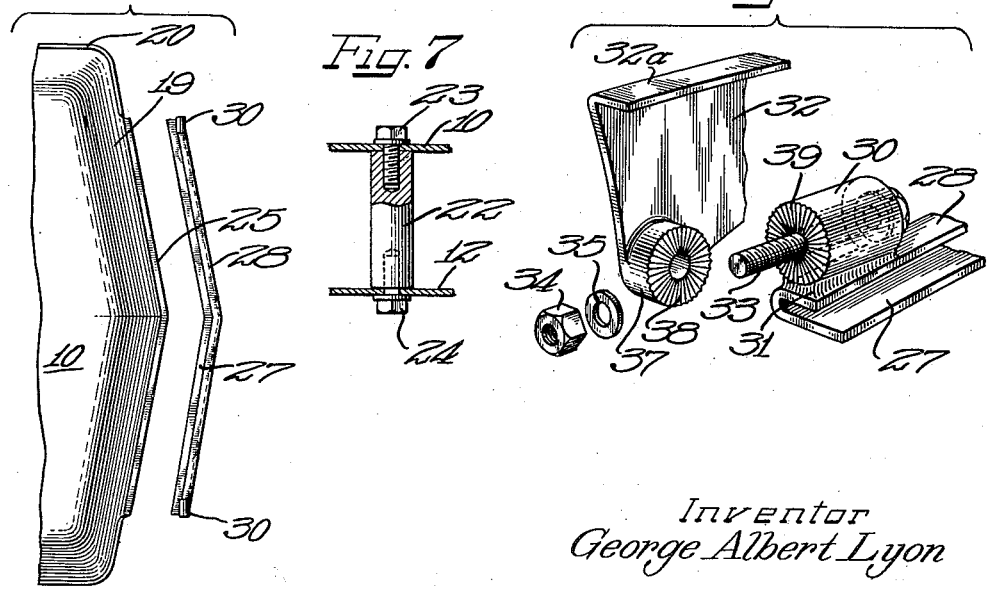

2,643,912

UNITED STATES PATENT OFFICE 2,643,912

TOP SHIELD FOR VEHICLES

George Albert Lyon, Detroit, Mich.

Application November 5, 1949, Serial No. 125,691

8 Claims. (Cl. 296—95)

The present invention relates to improvements in shield structures which may be readily mounted upon the roofs of vehicles such as automobiles, trucks, boats or the like.

Such a shield is useful as a deflector and protective medium for shielding the top or roof of a vehicle from the sun's rays and thereby protecting the interior of the vehicle from overheating with attendant discomfort to the passengers. This is especially useful with automobiles of the current trend in design to low, sweeping streamlined metal roof construction.

Moreover, the windows in automobiles are generally sloping both at front and rear and at the sides and it is therefore desirable to provide overhanging shielding and visor means to protect the windows not only from sunrays but also from rain, sleet, snow and the like.

Accordingly, it is an object of the present invention to provide an improved sun and weather shield for disposition over the tops of passenger vehicles.

Another object of the present invention is to provide an improved top shield for vehicles which may be readily mounted on or removed from the roof of a vehicle.

A further object of the invention is to provide a vehicle top shield construction which provides protective visor means for the window areas of the vehicle body.

Yet another object of the invention is to provide an improved vehicle top shield assembly comprising an adjustable front or windshield visor structure.

Still another object of the invention is to provide an improved front visor structure for a vehicle.

According to the general features of the present invention there is provided in a top shield for vehicles a plate dimensioned to overlie a vehicle roof in spaced relation and having side and rear overhanging portions to serve as protective visors for the sides and rear of the vehicle, and an adjustable forwardly projecting visor portion at the forward end of the panel for protecting the windshield of the vehicle.

According to other general features of the invention the forward end portion of the panel extends downwardly at the rear of the front visor portion and serves as a wind baffle for directing air stream traveling rearwardly under the front visor and upwardly over the panel.

According to still further features of the invention a supporting bracket secures the forward end of the panel in position and adjustably supports the front visor portion.

According to additional general features of the invention there is provided in a top shield for vehicles, a panel for overlying a vehicle roof in spaced relation and a separately formed cooperative forward visor member, the forward end portion of the panel and the rear end portion of the visor being in spaced relation and defining an air relief opening for rearward movement therebetween of air in the forward movement of the associated vehicle.

Other objects, features and advantages of the present invention will be readily apparent from the following detailed description of a preferred embodiment taken in conjunction with the accompanying drawings in which:

Figure 1 is a fragmentary side elevational view of an automobile showing my new top shield construction applied thereto;

Figure 2 is a top plan view of the top shield and the vehicle;

Figure 3 is a front elevational view of the top shield and the vehicle to which applied;

Figure 4 is an enlarged vertical sectional detail view taken substantially on the line IV—IV of Figure 2;

Figure 5 is a fragmental vertical sectional detail view taken substantially on the line V—V of Figure 4;

Figure 6 is an exploded perspective assembly view of one of the adjustable attachment assemblies for the front visor portion of the shield structure;

Figure 7 is an enlarged vertical fragmentary sectional detail view taken substantially on the line VII—VII of Figure 2; and Figure 8 is a fragmentary exploded top plan view of the forward end portion of the top shield panel and the attachment bracket therefor.

As shown on the drawings:

By way of illustration a top shield panel 10 is shown as applied in protective, shielding relation to the upper side of a vehicle such as an automobile 11 having a roof 12 over which the panel 10 is mounted in spaced relation. As is customary, the automobile 11 has windowed side walls 13, a windowed rear wall 14 and a windshield 15, all of which slope downwardly and outwardly from the roof 12.

According to the present invention the top shield 10 is formed as a substantially turtle-back panel from any suitable material such as sheet metal or sheet plastic, or the like and it may be surface finished in any preferred manner. In order to shield the windowed side and rear portions of the vehicle walls, the side margins of the panel 10 extend laterally a sufficient distance to provide lateral and downwardly extending side visor or shielding portions 17, and the rear end portion of the panel extends rearwardly and downwardly to provide a rear visor and shield portion 18 overhanging the rear wall 14 protectively. At its forward end, the panel 10 extends downwardly to provide a supporting flange 19.

In order to reinforce the side and rear edges of the panel 10 the marginal extremities or edges are preferably turned up to provide a reinforcing bead structure 20 which also serves to provide a drain-off gutter appropriately sloping toward drain openings 21 adjacent to the rear corners of the panel.

Means are provided for supporting the rear portion of the panel 10 in detachable spaced relation to the rear portion of the vehicle 12. Such supporting means comprise a plurality of attachment and supporting posts or studs 22 of appropriate length to afford the desired spacing when disposed endwise between the vehicle top 12 and the underside of the shield plate or panel 10. Any suitable means for securing the supporting and spacer studs 22 may be employed, such as screws 23 (Figs. 1, 2 and 7) securing the shield panel 10 to the upper ends of the respective studs 22, and screws 24 securing the lower ends of the studs to the roof panel 12 of the vehicle. For this purpose, the studs 22 may be appropriately bored and tapped or they may be formed from tubular stock and appropriately tapped. If preferred, of course, either end of the studs may be welded in place as for example, the upper ends may be welded or brazed to the shield plate or panel 10. However, for ready removal of the shield panel when desired some detachable means of attachment is preferred.

The forward end portion of the panel 10 is supported in spaced relation to the automobile top 12 by means of the front end marginal integral downturned flange 19 which is formed at its forward extremity with a forwardly projecting foot flange 25 (Figs. 4, 5 and 8). Where the windshield 15 as best seen in Figs. 1 and 2 is of generally wedge-tapered form, with the forward portion of the vehicle top 12 generally conforming to such wedge-taper, the forward end marginal flange 19 of the shield panel may also be conformably shaped as best seen in Figs. 2 and 8. Hence, the foot flange 25 may also conform to such shape.

Means for retaining the forward end portion of the shield panel 10 upon the vehicle top 12 may comprise a retaining bracket 27 in the form of a bar attached in any suitable fashion to the upper forward margin of the vehicle top 12. The bar 27 may be secured as by welding onto the top panel of the vehicle or it may be screwed on if desired. A return bent flange 28 along the forward margin of the bar 27 defines with the body of the bar a rearwardly opening channel complementary and retainingly receptive of the foot flange 25 of the shield panel as best seen in Figs. 4 and 5. Through this arrangement, mounting of the shield panel 10 upon the vehicle can be accomplished by inserting the foot flange 25 by a forward movement of the shield panel into the transversely elongated socket defined by the bracket flange 28, whereafter the rear end portion of the panel is attached to the vehicle roof through the medium of the attachment and retaining and spacer studs 22.

In order to afford overhanging protection for the windshield 15 a front visor portion 29 is provided as best seen in Figs. 1, 2 and 3. The visor portion 29 is preferably dimensioned to provide, in effect, a separate but cooperating forward extension of the shield panel 10, the transverse dimension of the visor 29 being substantially the same as the width of the panel 10 and the front rear dimension of the visor portion being properly proportioned for adequately protectively overhanging the windshield 15. The visor portion 29 is also preferably formed from suitable sheet material, similarly as the panel 10.

Means are preferably provided for mounting the visor 29 removably and adjustably. To this end, supporting blocks are mounted upon the opposite end portions of the bracket flange 28 as by welding the same thereto, indicated at 31. Appropriate wing brackets 32 are secured to the underside of the visor 29 as by welding or otherwise attaching respective angular flanges 32a on the brackets to the visor. The brackets 32 are properly spaced so that in assembly they oppose the outer ends of the mounting blocks 30. Suitable means such as bolts 33 extending on coaxial bores through the mounting blocks 30 are employed to secure the lower portions of the brackets 32 in place, the bolts being equipped with respective securing nuts 34 and lock washers 35 for this purpose.

In order to provide for the adjustment of the visor 29 as to overhanging angularity relative to the windshield 15, suitable means such as a radial face clutch structure between the supporting blocks 30 and the brackets 32 may be provided as best seen in Figs. 5 and 6. For this purpose the lower attachment portions of the brackets 32 are preferably provided with respective clutch bosses 37 which are appropriately bored for passage therethrough of the attachment bolts 33. A radially toothed clutch face 38 on each of the bosses 37 cooperates in assembly with a complementary radially toothed clutch face 39 on the associated attachment and supporting block 30. Hence when the bolts are tightened up, the visor 29 will be secured in a preferred angular position. Adjustment as to angularity may be easily effected by loosening the nuts 34 of the attachment bolts and moving the visor 29 to the preferred adjusted position. Inherent resiliency in the visor panel permits sufficient axial yielding of the bosses 37 and the supporting brackets 32 to enable camming of the clutch teeth in effecting adjustment. Merely by way of illustration, various adjusted positions of the visor 29 are indicated in Fig. 4 which illustrates a full line position of the visor and also dash outline and dot-dash outline positions of the visor. Removal of the visor can, of course, be readily effected by removing the attachment bolts 33.

Reinforcement of the front and side edges of the visor 29 is preferably effected by means of return bent or beaded marginal flange structure 40 which preferably also serves as a drain-off gutter appropriately sloping toward drain holes 41 at opposite sides of the visor.

Reinforcement of the rear edge of the visor 29 may be appropriately effected as by underturning the rear marginal extremity to provide a reinforcing return bent flange 42.

Since in the forward movement of the vehicle there is a tendency for air to be trapped under the visor 29, means are provided for air pressure relief, herein comprising disposing the rear margin of the visor 29 in appropriately spaced relation to the adjacent forward portion of the shield panel 10 and more particularly the downturned supporting flange 19 of the shield panel. This relationship is well illustrated in Fig. 4. By having the top shield panel forward flange 19 sloping downwardly and forwardly a smooth air baffle is provided which directs rearwardly moving air from under the visor 29 rearwardly and upwardly over the shield panel 10 with a minimum of resistance or turbulence through the relief slot defined between the rear margin of the visor and the forward margin of the shield panel.

It will be understood that modifications and variations may be effected without departing from the scope of the novel concepts of the present invention.

I claim as my invention:

1. In a top shield for vehicles, a panel dimensioned to overlie a vehicle roof in spaced relation and having side and rear overhanging portions to serve as protective visors for the sides and rear of the vehicle, and an adjustable forwardly projecting visor member at the forward end of the panel extending as substantially a forward projection of the panel for protecting the windshield of the vehicle, the forward end portion of the panel extending downwardly at the rear of the front visor member and in spaced relation thereto to provide an air vent gap and serving as a wind baffle for directing air stream traveling rearwardly under the front visor and upwardly through said gap and over the panel.

2. In a top shield for vehicles, a panel dimensioned to overlie a vehicle roof in spaced relation and having side and rear overhanging portions to serve as protective visors for the sides and rear of the vehicle, a forwardly projecting visor at the forward end of the panel for protecting the windshield of the vehicle, and a supporting bracket securing the forward end of the panel in position and also adjustably supporting the front visor.

3. In a top shield for vehicles, a panel for overlying a vehicle roof in spaced relation, a separately formed cooperative forward visor member, means for adjustably supporting said visor member to project forwardly from the forward portion of the panel, the forward end portion of the panel and the rear end portion of the visor member being in spaced relation and defining an air relief opening for rearward movement therebetween of air in the forward movement of the associated vehicle, the forward end portion of the panel comprising a downwardly extending flange for baffling the air that passes under the visor member through said opening and upwardly over the panel.

4. In combination in a vehicle having a roof and windowed side and rear walls, a shield panel of generally turtle-back shape having side and rear marginal downwardly sloping portions overhanging the side and rear walls of the vehicle, means supporting the rear portion of the panel in spaced relation over the top of the vehicle, the forward end portion of the panel being spaced rearwardly from the forward extremity of the vehicle top and having a downturned flange with a substantially horizontally extending terminal flange portion maintaining the forward end portion of the panel in spaced relation to the vehicle top, and bracket means generally complementary to said forward end terminal flange portion and carried by the vehicle top interengaging with said forward end terminal flange portion to retain the same in position on the vehicle roof.

5. In combination in a vehicle having a roof and windowed side and rear walls, a shield panel of generally turtle-back shape having side and rear marginal downwardly sloping portions overhanging the side and rear walls of the vehicle, means supporting the rear portion of the panel in spaced relation over the top of the vehicle, the forward end portion of the panel being spaced rearwardly from the forward extremity of the vehicle top and having a downturned flange maintaining the forward end portion of the panel in spaced relation to the vehicle top, means carried by the vehicle top interengaging with said forward end flange to retain the same in position, and a visor overhanging the front portion of the vehicle and supported by said last mentioned means.

6. In combination in a vehicle top shield panel and visor assembly, a panel body to be mounted in spaced relation upon a vehicle top, said panel body having a supporting flange to maintain the panel body in said spaced relation, means engaging the supporting flange to retain the same on a vehicle top, a visor arranged to project beyond said flange, and brackets carried by said visor and supportingly connected to said means.

7. In a top shield assembly for vehicles, a main top shield panel, said panel having a front marginal downturned supporting flange including a foot flange portion for supporting the panel in spaced relation above a vehicle top, a retaining bracket retainingly interengageable with said foot flange, a visor arranged to project beyond said downturned flange and above the foot flange portion thereof, and means adjustably supporting the visor on said bracket.

8. In a vehicle top shield construction, a panel having a downturned front supporting and wind baffle flange formed with a forwardly projecting foot flange, a bracket bar having a return bent flange defining a socket within which the foot flange is retainingly received, a visor, and means connecting the visor to said return bent flange in spaced relation to said downturned flange to define an air relief vent opening between the visor and said downturned flange.

GEORGE ALBERT LYON.

References Cited in the file of this patent

UNITED STATES PATENTS

| Number | Name | Date |
|---|---|---|
| 1,394,084 | Gross | Oct. 18, 1921 |
| 1,448,683 | White et al. | Mar. 13, 1923 |
| 2,231,293 | Norman | Feb. 11, 1941 |
| 2,334,856 | Atkinson | Nov. 23, 1943 |
| 2,361,924 | Boynton | Nov. 7, 1944 |
| 2,523,104 | Emmert | Sept. 19, 1950 |
| 2,602,406 | Orter | July 8, 1952 |